United States Patent
Chen

(10) Patent No.: US 7,364,143 B2
(45) Date of Patent: Apr. 29, 2008

(54) ADJUSTABLE SUSPENSION FORK

(76) Inventor: Hui-Hsiung Chen, No. 34, Chia-Hou Rd., Waipu, Taichung (TW)

( * ) Notice: Subject to any disclaimer, the term of this patent is extended or adjusted under 35 U.S.C. 154(b) by 303 days.

(21) Appl. No.: 11/166,066

(22) Filed: Jun. 27, 2005

(65) Prior Publication Data

US 2006/0290095 A1 Dec. 28, 2006

(51) Int. Cl.
*B62K 21/20* (2006.01)
(52) U.S. Cl. .............. 267/64.22; 280/276; 188/319.2
(58) Field of Classification Search .............. 267/217, 267/218, 64.15, 64.22; 280/276, 277; 188/319.2
See application file for complete search history.

(56) References Cited

U.S. PATENT DOCUMENTS

| 4,746,106 A | * | 5/1988 | Fukumura | 267/218 |
| 5,634,653 A | * | 6/1997 | Browning | 280/276 |
| 5,944,283 A | * | 8/1999 | Carter, Jr. | 244/104 FP |
| 6,260,832 B1 | * | 7/2001 | Vignocchi et al. | 267/64.15 |
| 6,382,370 B1 | * | 5/2002 | Girvin | 188/299.1 |
| 6,505,719 B2 | * | 1/2003 | Gonzalez et al. | 188/319.2 |
| 6,592,136 B2 | * | 7/2003 | Becker et al. | 280/276 |
| 7,044,274 B2 | * | 5/2006 | Chen | 188/319.2 |
| 7,134,534 B2 | * | 11/2006 | Chen | 188/322.13 |

* cited by examiner

*Primary Examiner*—Kevin Hurley
(74) *Attorney, Agent, or Firm*—Rosenberg, Klein & Lee

(57) ABSTRACT

A suspension front fork includes a lower tube with a closed bottom and an upper tube is movably inserted in the lower tube. Hydraulic oil is filled in the lower tube and has an oil level in the upper tube. A damper assembly is fixedly received in the upper tube and includes a spring and a piston which is biased by the spring and seals a side hole. A control assembly is movably received in the upper tube and includes a damper member which is connected to the adjustment assembly. An adjustment rod extends from the damper member and a lower end of the adjustment rod is movably inserted through the outlet of the damper assembly. A gap is defined between an inner periphery of the outlet and the lower end of the adjustment rod so that a size of the gap can be adjustable by moving the adjustment rod relative to the inner periphery of the outlet to adjust volume of hydraulic oil entering the damper member.

10 Claims, 5 Drawing Sheets

ADJUSTABLE SUSPENSION FORK

FIELD OF THE INVENTION

The present invention relates to a suspension fork where air pressure and the volume of hydraulic oil in the fork can be adjusted to meet various rider requirements.

BACKGROUND OF THE INVENTION

A prior art suspension front fork is shown in FIG. 6 and generally includes a lower tube 81 and an end of an upper tube 82 which is movably inserted into the lower tube 81. Hydraulic oil is filled in the lower tube 81 and a chamber 85 is defined above the oil level in the upper tube 82. A valve assembly 84 seals a top of the upper tube 82 so as to keep the pressure in the chamber 85 higher than the atmosphere. A damper assembly 86 is fixed to a lower end of the upper tube 82 and located in the lower tube 81. The damper assembly 86 is submerged in the hydraulic oil and includes a passage 861. A piston 862 is received in the damper assembly 86 and an outlet 863 is defined through a top of the damper assembly 86. A spring 864 is received in the damper assembly 86 and pushes the piston 862 to be located at a lower position in the damper assembly 86. When the bicycle rides on terrain roads, to absorb shocks and vibrations the upper tube 82 is moved toward the lower tube 81 and oil in volume 83a is displaced and passes through damper assembly 86 to volume 83 to absorb a terrain bump. As the bump passes, upper tube 82 moves away from lower tube 81 and oil from volume 83 passes through passage 861 driven by air pressure in volume 85 returning to volume 83a. The action of the fork is dependent on several factors including the viscosity of the hydraulic oil, temperature, pressure in the chamber 85, size of the orifice in passage 861, etc. Additionally, there are rider preferences for the action of the fork and the prior art suspension fork allows only pressure adjustment as an external rider adjustment of the fork action.

The present invention intends to provide an additional means for adjustment of the suspension wherein the damping forces can be modified by rotating an adjusting ring on top of the front fork. This, along with the pressure adjustments, allows the rider to "tune" the suspension to a desired action and compensate for external factors like temperature.

SUMMARY OF THE INVENTION

The present invention relates to a front suspension fork for bicycles wherein a leg includes a lower tube with a closed bottom and an upper tube whose lower end is movably inserted into the lower tube. An adjustment assembly and a valve assembly are connected to a top end of the upper tube. Hydraulic oil is filled in the lower tube and the oil level is located in the upper tube. A chamber is defined in the upper tube and located above the oil level. The chamber is filled with pressurized air. A damper assembly is fixed in the upper tube and is submerged in the hydraulic oil which includes various oil control passages including an opening in a top and an outlet in a bottom thereof. A control assembly is movably received in the upper tube and connected to the damper assembly. An adjustment rod extends from the control assembly and a lower end of the adjustment rod is movably inserted into an outlet. A gap is defined between an inner periphery of the outlet and the lower end of the adjustment rod. The size of the gap can be adjustable by moving the adjustment rod relative to the inner periphery of the outlet.

The primary object of the present invention is to provide an external adjustment of suspension front fork wherein the rate of hydraulic oil flowing through the damper member in certain conditions is adjusted by changing the gap between the adjustment rod and the outlet of the damper member.

Another object of the present invention is to provide an adjustable suspension front fork wherein the pressure in the upper tube can be adjusted according to different needs.

A further object of the present invention is to provide an adjustable suspension front fork wherein the hydraulic oil is compressed to generate bubbles when flowing.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
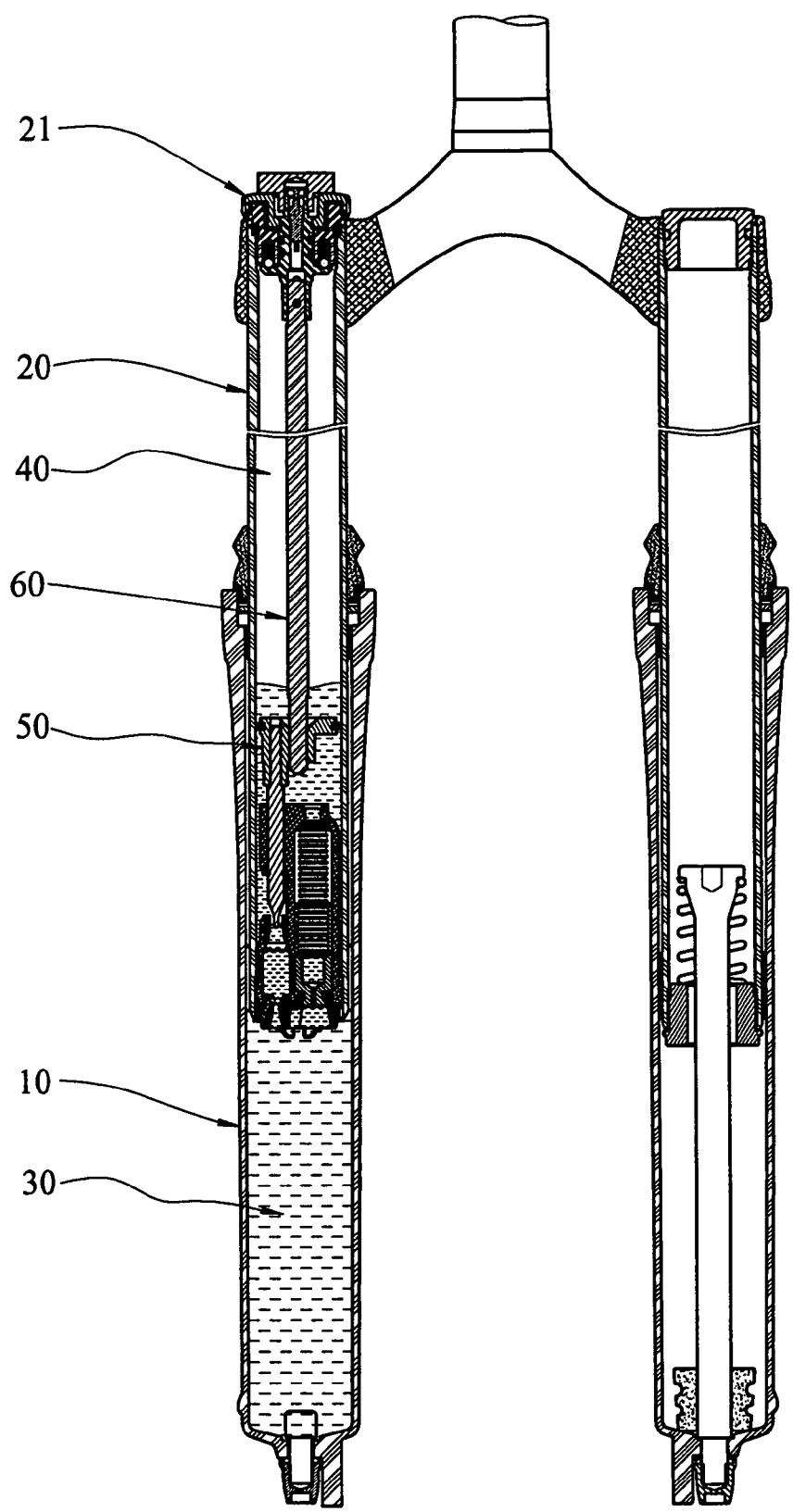
FIG. 1 is a cross sectional view to show the suspension front fork of the present invention.
Figure 2:
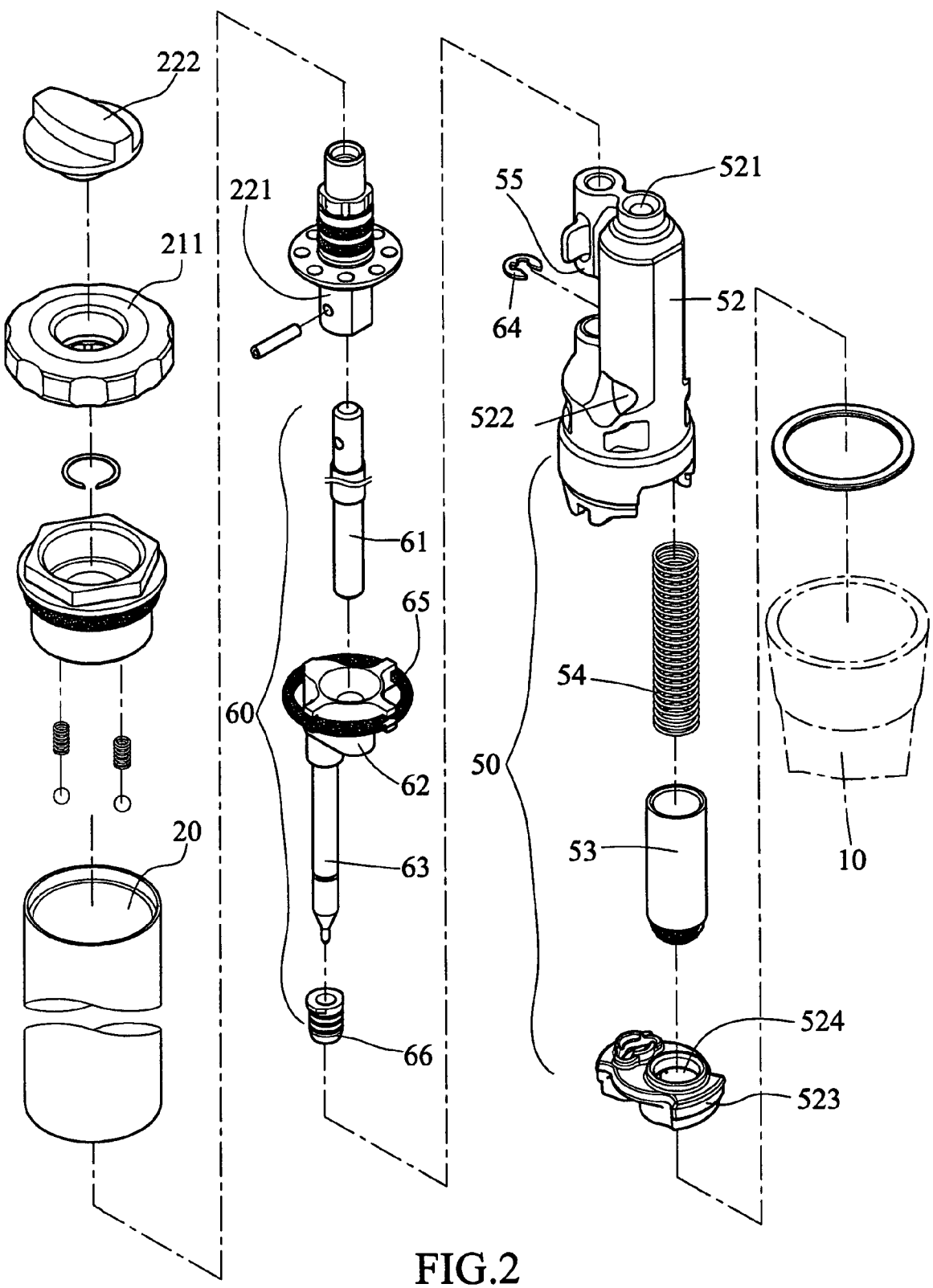
FIG. 2 is an exploded view to show the damper assembly and the control assembly of the suspension front fork of the present invention.
Figure 3:
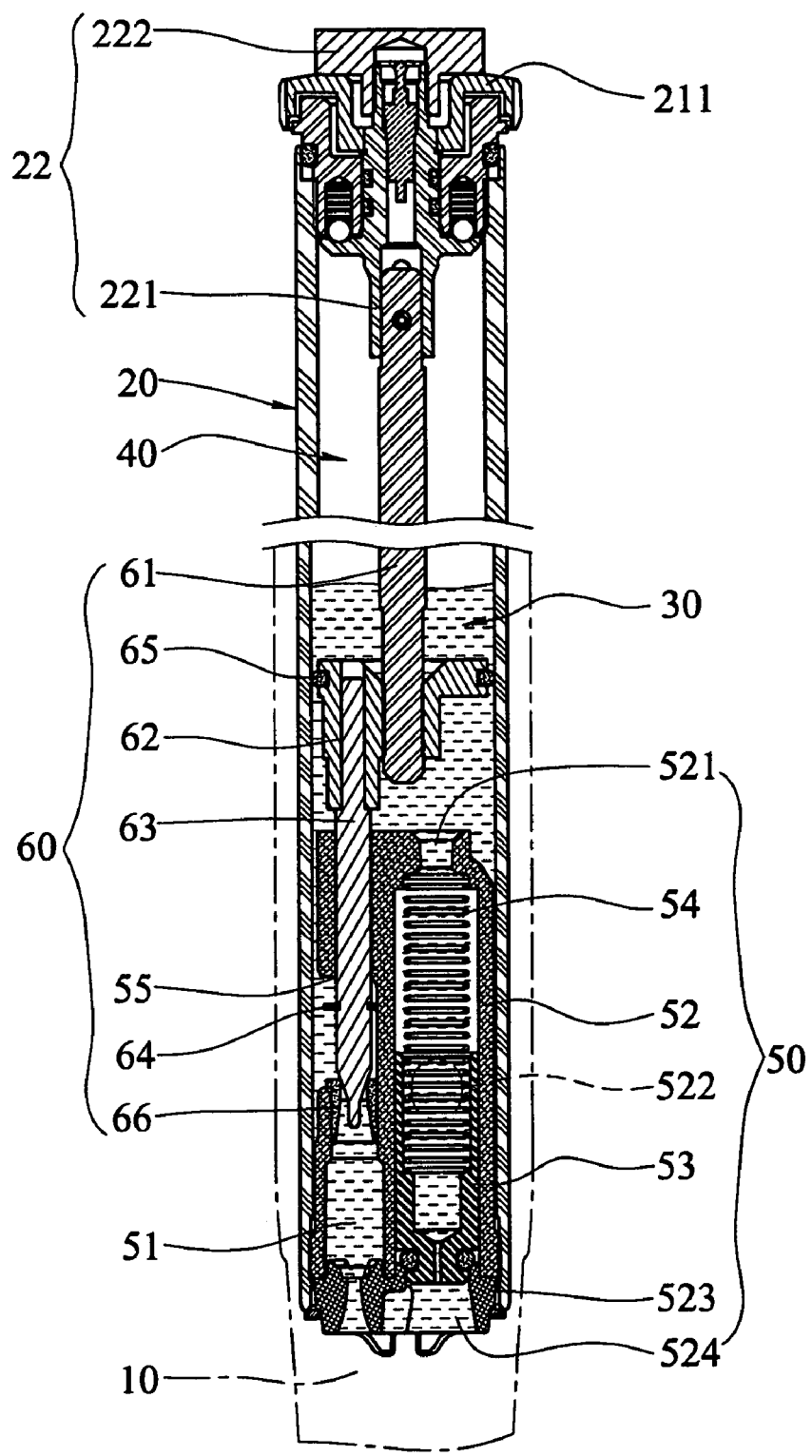
FIG. 3 is an enlarged cross section view to show the suspension front fork of the present invention.

Referring to FIGS. 1 to 3, the suspension front fork of the present invention wherein a leg includes a lower tube 10 with a closed bottom and an upper tube which has a lower end thereof movably inserted into the lower tube 10 so as to absorb shocks from the roads.

An adjustment assembly 21 and a valve assembly 22 are connected to a top end of the upper tube 20. Hydraulic oil 30 is filled in the lower tube 10 and the oil level of the hydraulic oil 30 is in the upper tube 20. A chamber 40 is defined in the upper tube 20 and above the oil level. The chamber 40 is filled with pressurized air and the pressure in the chamber 40 is set to be higher than that of the atmosphere. The users may change the pressure in the chamber 40 via the valve assembly 22. The adjustment assembly 21 includes an adjusting ring 211, a valve shaft member 221 and appropriate seals which is received in the upper tube 20 and is connected to the adjusting shaft 61. The outer periphery of the adjusting ring 211 is exposed at the top of the upper tube 20. The valve shaft member 221 is connected to the control assembly 60 and the valve assembly 22 is connected to a top of the valve shaft member 221. A cap 222 is connected to the valve assembly 22.

A damper assembly 50 is fixedly received in the upper tube 20 and close to the bottom. The damper assembly 50 is located below the oil level and includes a hollow body 52, a piston 53 and a spring 54. The hollow body 52 includes a main portion and a sub-portion which is connected to the main portion and in parallel with the main portion. An aperture 521 is defined in a top of the main portion of the body 52 and a side hole 522 is defined radially through a wall of the body 52. The side hole 522 is in communication with the aperture 521. The piston 53 and the spring 54 are received in the main portion of the body 52 and the spring 54 pushes the piston 53 toward the closed end of the lower tube 10. An outlet 51 is defined in a bottom of the sub-portion. An end member 523 is connected to an underside of the body 52 and includes a hole communicating with the outlet 51 and an inlet 524 is defined through the end member 523 and in communication with the aperture 521.

Figure 4:
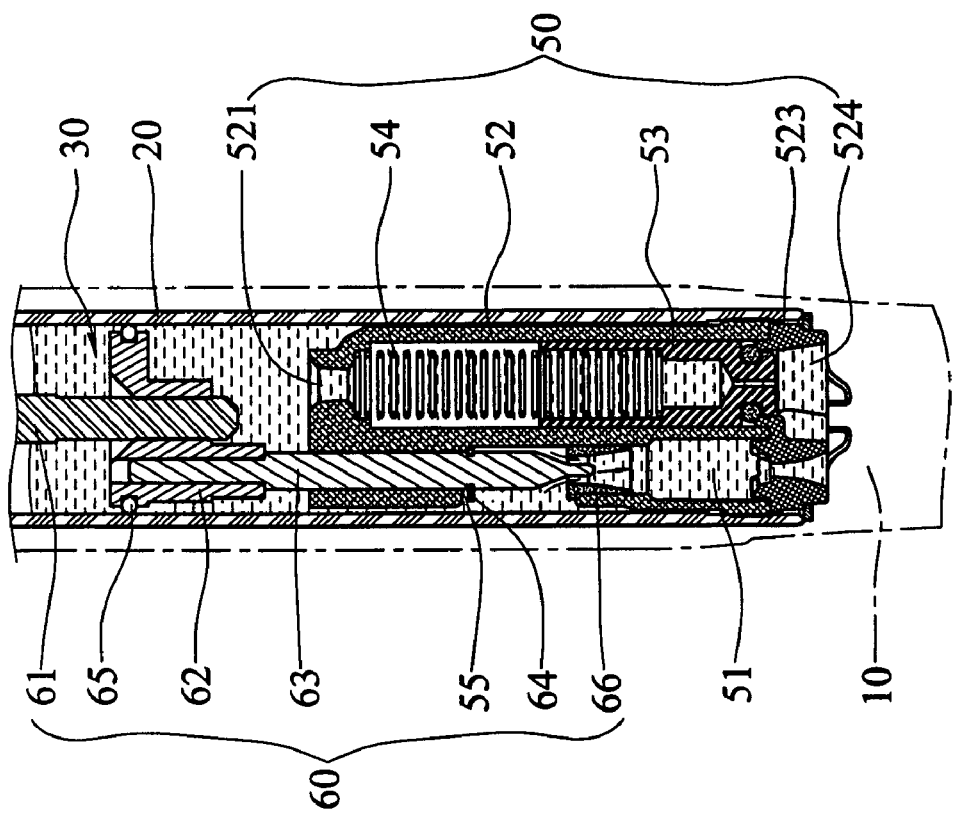
FIGS. 4 and 5 show positions of the adjustment rod as it is moved relative to the outlet of the damper member.
Figure 5:
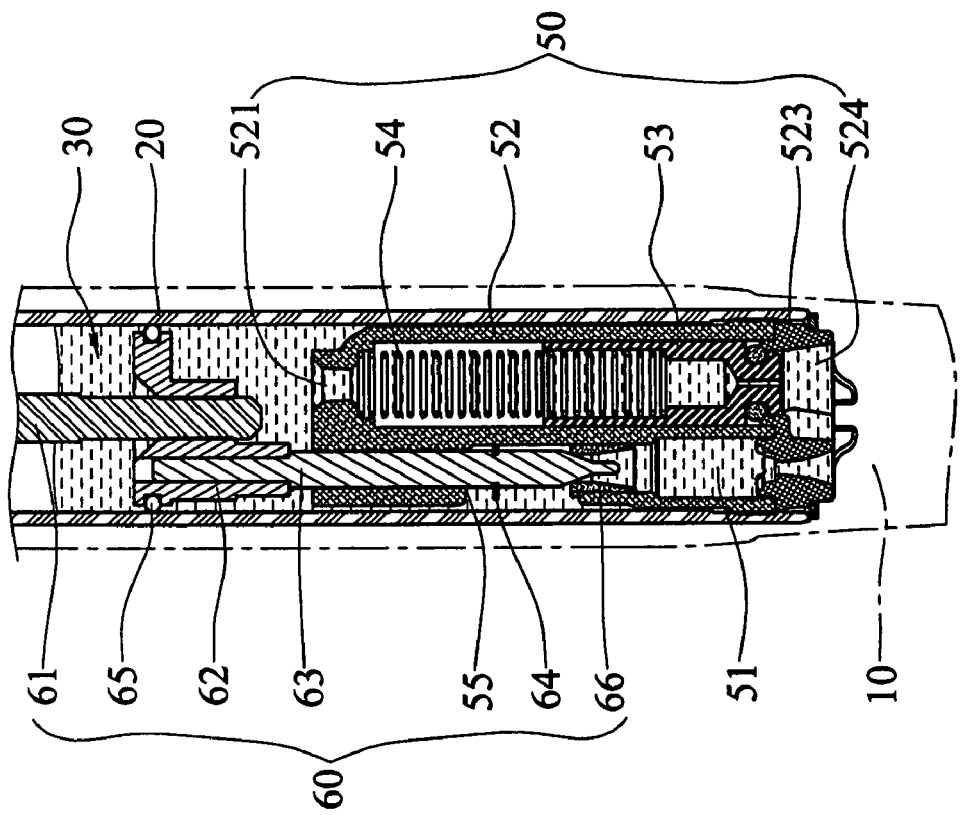
Figure 6:
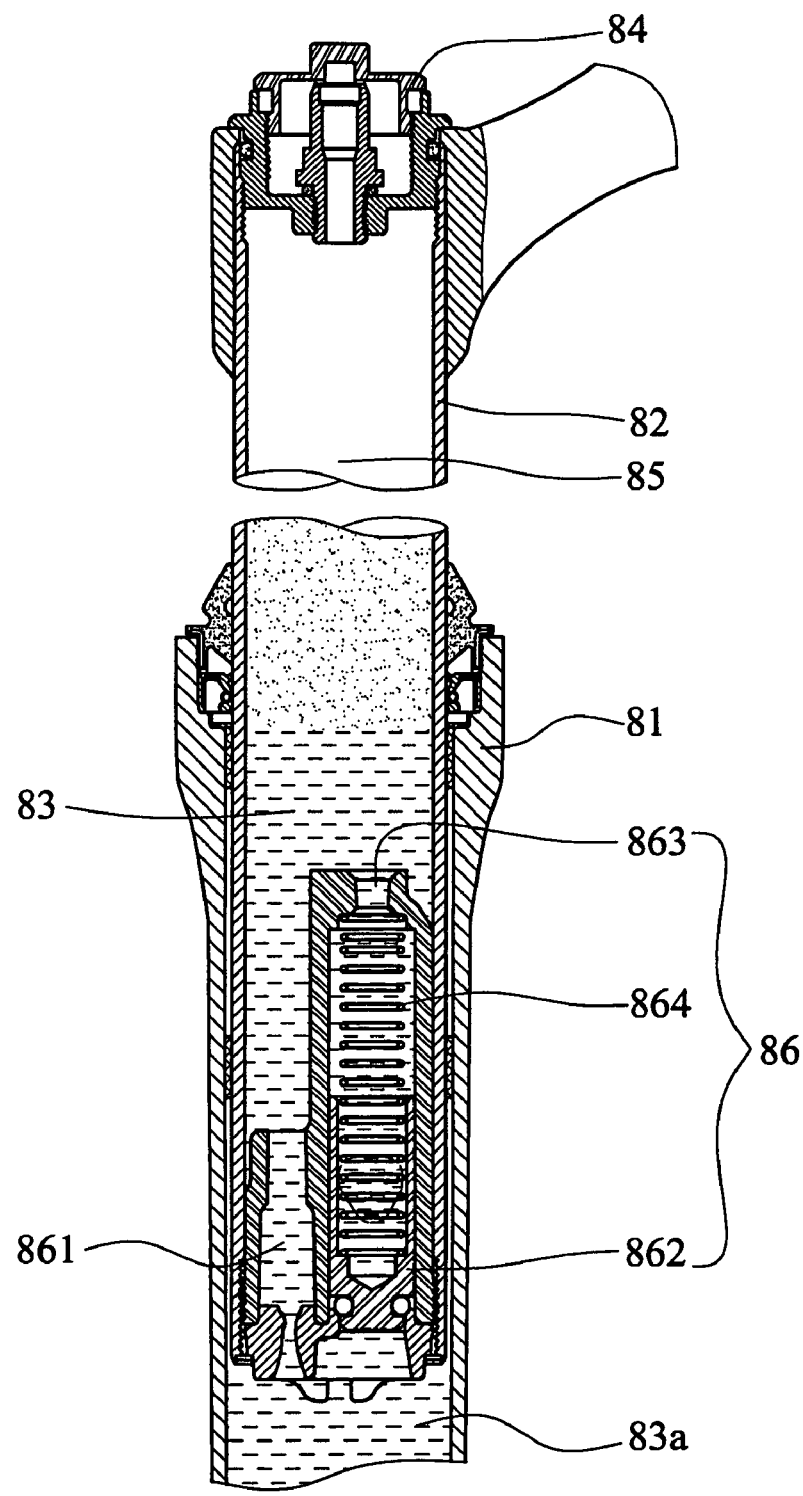
FIG. 6 is a cross sectional view to show a suspension front fork of prior art without the adjustments of the present invention.

A control assembly 60 is movably received in the upper tube 20 and includes a connection rod 61 and includes a damper member 62 to which a lower end of the connection rod 61 is connected via a threaded interface. A top end of the connection rod 61 is connected to a valve shaft member 221 of the adjustment assembly 21 so that the damper member 62 and adjustment rod 63 are moved up and down by rotating the adjusting ring 211 connected to connection rod 61 through the threaded interface between connection rod 61 and damper member 62. An adjustment rod 63 extends from the damper member 62 and a lower end of the adjustment rod 63 is movably inserted into the outlet 51. A sleeve 66 is engaged with the outlet 51 and the lower end of the adjustment rod 63 is movably inserted into the sleeve 66. The sleeve 66 includes a cone-shaped inner periphery and the lower end of the adjustment rod 63 is a shaped end which is complementary to the inner periphery of the sleeve 66. A gap is defined between an inner periphery of the sleeve 66 and the lower end of the adjustment rod 63, and the size of the gap can be adjustable by moving the adjustment rod 63 relative to the inner periphery of the outlet 51 as shown in FIGS. 4 and 5. It is noted that the sleeve 66 can be omitted and the outlet 51 made to provide the function. It is also noted that the end of the adjustment rod 63 can be made with different shapes to provide for different flow characteristics.

The damper assembly 50 includes a stop surface 55 in an underside thereof and the adjustment rod 63 extends through the stop surface 55. A stop member 64 such as an E-shaped clip which is connected to the adjustment rod 63 so as to be stopped by the stop surface 55 to limit upward movement of the adjustment rod 63.

When the vibration is mild, the piston 53 is not pushed upward to compress the spring 54 and the side hole 522 is still sealed by the piston 53, so that there will be only little relative movement between the upper tube 20 and the lower tube 10.

On the contrary, when the vibrations or shocks are severe, lower tube 20 is moved upward and the upward pressure overcomes the spring 54 and the pressure in the chamber 40. The hydraulic oil 30 below the damper assembly 50 flows through the main portion of the damper member 52 and pushes the piston 53 upward. The side hole 522 is then opened to allow large amount of hydraulic oil 30 to flow upward so as to absorb the shocks.

After the shocks are absorbed, the hydraulic oil 30 flows back to the lower tube 10 via the gap between the lower end of the adjustment rod 63 and the sleeve 66. The larger the gap is, the faster the lower tube 10 and the upper tube 20 are moved in opposite directions to their original positions.

By rotating the adjusting ring 211 to adjust the size of the gap, the damping force of the suspension front fork can be conveniently adjusted to meet different needs. The stop member 64 on the adjustment rod 63 retains the adjustment rod 63 in the sub-portion of the damper member 52. The users may also adjust the pressure in the chamber 40 by the valve assembly 22 to properly increase the pressure applied on the piston 53.

It is noted that the technology of the present invention can also be used in rear suspension for bicycles, suspension devices of motorcycles, scooters, etc., even a single leg fork or a suspension fork with more than two legs can be easily derived from the disclosure of the present invention.

While we have shown and described the embodiment in accordance with the present invention, it should be clear to those skilled in the art that further embodiments may be made without departing from the scope of the present invention.

What is claimed is:

1. A suspension front fork, comprising:
   a leg including a lower tube with a closed bottom;
   an upper tube having a lower end thereof movably inserted into the lower tube and an adjustment assembly and a valve assembly connected to a top end of the upper tube, hydraulic oil filled in the lower tube and having an oil level in the upper tube, a chamber defined in the upper tube and above the oil level, the chamber filled with pressurized air;
   a damper assembly fixedly received in the upper tube and close to a bottom, the damper assembly located below the oil level and having an outlet defining a conically tapered inner periphery in a bottom thereof, and
   a control assembly movably received in the upper tube and the adjustment assembly connected to a top of the control assembly, the damper assembly connected to a lower end of the control assembly, an adjustment rod extending from the control assembly and a lower end of the adjustment rod movably inserted into the outlet, a gap defined between the inner periphery of the outlet and the lower end of the adjustment rod, a size of the gap being adjustable by axially moving the adjustment rod within the conically tapered inner periphery of the outlet.

2. The front fork as claimed in claim 1, wherein the outlet includes a shaped inner periphery and the lower end of the adjustment rod is a shaped end which is complementary to the inner periphery of the outlet, and said shapes provide various functions based on the compliment of contours.

3. A suspension front fork, comprising:
   a leg including a lower tube with a closed bottom;
   an upper tube having a lower end thereof movably inserted into the lower tube and an adjustment assembly and a valve assembly connected to a top end of the upper tube, hydraulic oil filled in the lower tube and having an oil level in the upper tube, a chamber defined in the upper tube and above the oil level, the chamber filled with pressurized air;
   a damper assembly fixedly received in the upper tube and close to a bottom, the damper assembly located below the oil level and having an outlet defined in a bottom thereof, and
   a control assembly movably received in the upper tube and the adjustment assembly connected to a top of the control assembly, the damper assembly connected to a lower end of the control assembly, an adjustment rod extending from the control assembly and a lower end of the adjustment rod movably inserted into the outlet, a gap defined between an inner periphery of the outlet and the lower end of the adjustment rod, a size of the gap being adjustable by moving the adjustment rod relative to the inner periphery of the outlet;
   wherein the damper assembly includes a hollow body, a piston and a spring, an aperture is defined in a top of the body and a side hole is defined radially through a wall of the body, the side hole is in communication with the aperture, the piston and the spring are received in the body and the spring pushes the piston toward the closed end of the lower tube.

4. The front fork as claimed in claim 3, wherein an end member is connected to an underside of the body and includes a hole communicating with the outlet, an inlet is defined through the end member and in communication with the aperture.

5. A suspension front fork, comprising:
a leg including a lower tube with a closed bottom;
an upper tube having a lower end thereof movably inserted into the lower tube and an adjustment assembly and a valve assembly connected to a top end of the upper tube, hydraulic oil filled in the lower tube and having an oil level in the upper tube, a chamber defined in the upper tube and above the oil level, the chamber filled with pressurized air;
a damper assembly fixedly received in the upper tube and close to a bottom, the damper assembly located below the oil level and having an outlet defined in a bottom thereof, and
a control assembly movably received in the upper tube and the adjustment assembly connected to a top of the control assembly, the damper assembly connected to a lower end of the control assembly, an adjustment rod extending from the control assembly and a lower end of the adjustment rod movably inserted into the outlet, a gap defined between an inner periphery of the outlet and the lower end of the adjustment rod, a size of the gap being adjustable by moving the adjustment rod relative to the inner periphery of the outlet;
wherein the control assembly includes a connection rod and a damper member to which a lower end of the connection rod is connected, a top end of the connection rod is connected to the adjustment assembly, the adjustment rod extends from the damper member.

6. The front fork as claimed in claim 5, wherein an O-ring is mounted to the damper member and in contact with an inner periphery of the upper tube.

7. A suspension front fork, comprising:
a leg including a lower tube with a closed bottom;
an upper tube having a lower end thereof movably inserted into the lower tube and an adjustment assembly and a valve assembly connected to a top end of the upper tube, hydraulic oil filled in the lower tube and having an oil level in the upper tube, a chamber defined in the upper tube and above the oil level, the chamber filled with pressurized air;
a damper assembly fixedly received in the upper tube and close to a bottom, the damper assembly located below the oil level and having an outlet defined in a bottom thereof, and
a control assembly movably received in the upper tube and the adjustment assembly connected to a top of the control assembly, the damper assembly connected to a lower end of the control assembly, an adjustment rod extending from the control assembly and a lower end of the adjustment rod movably inserted into the outlet, a gap defined between an inner periphery of the outlet and the lower end of the adjustment rod, a size of the gap being adjustable by moving the adjustment rod relative to the inner periphery of the outlet;
wherein the damper assembly includes a stop surface in an underside thereof and the adjustment rod extends through the stop surface, a stop member connected to the adjustment rod so as to be stopped by the stop surface to limit upward movement of the adjustment rod.

8. The front fork as claimed in claim 7, wherein the stop member is an E-shaped clip.

9. A suspension front fork, comprising:
a leg including a lower tube with a closed bottom;
an upper tube having a lower end thereof movably inserted into the lower tube and an adjustment assembly and a valve assembly connected to a top end of the upper tube, hydraulic oil filled in the lower tube and having an oil level in the upper tube, a chamber defined in the upper tube and above the oil level, the chamber filled with pressurized air;
a damper assembly fixedly received in the upper tube and close to a bottom, the damper assembly located below the oil level and having an outlet defined in a bottom thereof, and
a control assembly movably received in the upper tube and the adjustment assembly connected to a top of the control assembly, the damper assembly connected to a lower end of the control assembly, an adjustment rod extending from the control assembly and a lower end of the adjustment rod movably inserted into the outlet, a gap defined between an inner periphery of the outlet and the lower end of the adjustment rod, a size of the gap being adjustable by moving the adjustment rod relative to the inner periphery of the outlet;
wherein the adjustment assembly includes an adjusting ring and a valve member which is received in the upper tube and is connected to the adjusting ring which is located on the top of the upper tube, the valve member is connected to the control assembly and the valve assembly is connected to a top of the valve member, a knob is connected to the valve assembly.

10. A suspension front fork, comprising:
a leg including a lower tube with a closed bottom;
an upper tube having a lower end thereof movably inserted into the lower tube and an adjustment assembly and a valve assembly connected to a top end of the upper tube, hydraulic oil filled in the lower tube and having an oil level in the upper tube, a chamber defined in the upper tube and above the oil level, the chamber filled with pressurized air;
a damper assembly fixedly received in the upper tube and close to a bottom, the damper assembly located below the oil level and having an outlet defined in a bottom thereof, and
a control assembly movably received in the upper tube and the adjustment assembly connected to a top of the control assembly, the damper assembly connected to a lower end of the control assembly, an adjustment rod extending from the control assembly and a lower end of the adjustment rod movably inserted into the outlet, a gap defined between an inner periphery of the outlet and the lower end of the adjustment rod, a size of the gap being adjustable by moving the adjustment rod relative to the inner periphery of the outlet;
wherein a sleeve is engaged with the outlet and the lower end of the adjustment rod movably inserted through the sleeve, the sleeve includes a cone-shaped inner periphery and the lower end of the adjustment rod is a cone-shaped end which is complementary to the cone-shaped inner periphery of the sleeve.

* * * * *